US007781501B2

(12) United States Patent (10) Patent No.: US 7,781,501 B2
Dopico et al. (45) Date of Patent: Aug. 24, 2010

(54) THERMOSETTING ADHESIVES COMPRISING A RESIN HAVING AZETIDINIUM FUNCTIONAL GROUPS

(75) Inventors: Pablo Dopico, Conyers, GA (US); Cornel Hagiopol, Lilburn, GA (US); Jason Rivers, Monroe, GA (US); Richard Rammon, Stockbridge, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 11/467,669

(22) Filed: Aug. 28, 2006

(65) Prior Publication Data

US 2007/0054144 A1 Mar. 8, 2007

Related U.S. Application Data

(60) Provisional application No. 60/713,382, filed on Sep. 2, 2005.

(51) Int. Cl.
*C08L 97/02* (2006.01)
*C08L 5/00* (2006.01)
*A61K 8/73* (2006.01)

(52) U.S. Cl. .......................................... 524/14; 524/27
(58) Field of Classification Search .................. 524/13, 524/27, 14
See application file for complete search history.

(56) References Cited

U.S. PATENT DOCUMENTS

| 2,640,046 | A | * | 5/1953 | Thurston ..................... 528/255 |
| 2,722,523 | A | * | 11/1955 | Gilchrist et al. ............... 524/47 |
| 3,556,932 | A | * | 1/1971 | Coscia ....................... 162/166 |
| 3,931,110 | A |   | 1/1976 | Freeman et al. |
| 4,210,692 | A |   | 7/1980 | Bohme et al. |
| 4,379,874 | A | * | 4/1983 | Stoy ............................ 524/27 |
| 4,490,518 | A | * | 12/1984 | Fuzesi et al. ................. 527/401 |
| 4,608,407 | A | * | 8/1986 | Kerimis et al. ................. 524/14 |
| 4,801,631 | A | * | 1/1989 | Sachs et al. ................... 524/18 |
| 4,915,766 | A |   | 4/1990 | Baxter |
| 5,171,795 | A | * | 12/1992 | Miller et al. .................. 525/430 |
| 5,183,837 | A | * | 2/1993 | Lepori et al. ................... 524/13 |
| 5,187,219 | A | * | 2/1993 | Furman, Jr. .................. 524/377 |
| 5,344,871 | A |   | 9/1994 | Timm et al. |
| 5,407,980 | A |   | 4/1995 | Pizzi et al. |
| 5,502,091 | A | * | 3/1996 | Dasgupta ...................... 524/55 |
| 5,506,285 | A | * | 4/1996 | Timm et al. .................... 524/13 |
| 5,541,251 | A |   | 7/1996 | Bontinck et al. |
| 5,614,597 | A | * | 3/1997 | Bower ......................... 525/430 |
| 5,693,698 | A | * | 12/1997 | Patel et al. ................... 524/386 |
| 5,969,012 | A | * | 10/1999 | Harris, Jr. ..................... 524/55 |
| 5,998,511 | A | * | 12/1999 | Westland et al. ............... 524/13 |
| 6,015,611 | A | * | 1/2000 | Deaner et al. ................. 428/326 |
| 6,183,849 | B1 | * | 2/2001 | Lindsay et al. ............. 428/292.4 |
| 6,207,013 | B1 | * | 3/2001 | Oriaran et al. ................ 162/111 |
| 6,231,985 | B1 |   | 5/2001 | Chen et al. |
| 6,306,997 | B1 |   | 10/2001 | Kuo et al. |
| 6,365,650 | B1 |   | 4/2002 | Chen et al. |
| 6,468,660 | B2 | * | 10/2002 | Ogle et al. ................... 428/413 |
| 6,506,939 | B1 | * | 1/2003 | Littlewood et al. ........... 564/205 |
| 6,511,579 | B1 | * | 1/2003 | Edwards et al. ............. 162/111 |
| 6,518,387 | B2 | * | 2/2003 | Kuo et al. .................... 527/100 |
| 6,586,520 | B1 | * | 7/2003 | Canorro et al. .............. 524/514 |
| 6,750,310 | B1 | * | 6/2004 | Skinner ........................ 528/56 |
| 6,846,564 | B1 | * | 1/2005 | Pascault et al. .............. 428/402 |
| 7,022,756 | B2 | * | 4/2006 | Singer ......................... 524/14 |
| 7,205,369 | B2 | * | 4/2007 | Song .......................... 526/295 |
| 2001/0009309 | A1 | * | 7/2001 | Taguchi et al. .............. 264/115 |
| 2002/0074098 | A1 | * | 6/2002 | Shannon et al. ............. 162/166 |
| 2002/0173580 | A1 |   | 11/2002 | Allen |
| 2003/0109604 | A1 | * | 6/2003 | Frick et al. ..................... 524/13 |
| 2004/0024092 | A1 | * | 2/2004 | Soerens et al. ................ 524/13 |
| 2004/0037906 | A1 |   | 2/2004 | Li et al. |
| 2004/0089418 | A1 |   | 5/2004 | Li |
| 2004/0097617 | A1 | * | 5/2004 | Manka et al. .................. 524/13 |
| 2004/0140055 | A1 | * | 7/2004 | Chen et al. ................... 156/355 |
| 2004/0143039 | A1 | * | 7/2004 | Hollomon et al. ............. 524/35 |
| 2005/0070635 | A1 | * | 3/2005 | Breyer et al. .................. 524/13 |
| 2005/0261404 | A1 | * | 11/2005 | Rivers et al. ................. 524/170 |
| 2006/0111480 | A1 | * | 5/2006 | Hansen et al. ................ 524/27 |
| 2006/0148936 | A1 | * | 7/2006 | Willett et al. ................. 524/13 |
| 2006/0157196 | A1 | * | 7/2006 | Koepnick et al. ............ 156/336 |
| 2006/0249445 | A1 | * | 11/2006 | Wu et al. ................. 210/500.27 |
| 2006/0270801 | A1 | * | 11/2006 | Hagiopol et al. ............. 525/218 |

(Continued)

FOREIGN PATENT DOCUMENTS

JP 52100535 A2 8/1977

(Continued)

OTHER PUBLICATIONS

Li, K. et al., "Investigation of Soy Protein-Kymene Adhesive Systems for Wood Composites," Journal of the American Oil Chemists' Society, vol. 81, No. 5, pp. 487-491 (2004).

(Continued)

*Primary Examiner*—Mark Eashoo
*Assistant Examiner*—Liam J Heincer
(74) *Attorney, Agent, or Firm*—Michael S. Kerns

(57) ABSTRACT

Thermosetting adhesives for use in e.g., particleboard or fiberboard, wherein the adhesives comprise a resin having azetidinium functional groups, can provide fast tack-building and curing, as well as ultimately excellent bonding characteristics. Preferably, the azetidinium-functional resin is formed from the reaction product of a polyamidoamine and epichlorohydrin.

18 Claims, No Drawings

FOREIGN PATENT DOCUMENTS

| JP | 60007668 B4 | 2/1985 |
|----|-------------|--------|
| JP | 2000239646 A2 | 2/1999 |
| JP | 2001003022 A2 | 1/2001 |

OTHER PUBLICATIONS

Li, K. at al., "Investigation of Formaldehyde-Free Wood Adhesives from Kraft Lignin and a Polyaminoamide-Epichlorohydrin Resin," Journal of Adhesion Science and Technology, vol. 18, No. 4, pp. 427-439 (2004).

Vertnick, L., "Bonding Wood with Polyamide Adhesives," Adhesives Age, vol. 10, No. 7, pp. 27-29 (1967).

Mini-Encyclopedia of Papermaking Wet-End Chemistry, PAAE, at hettp://www4.ncsu.edu/unity/users/h/hubbe/www/PAAE.htm, printed on Aug. 26, 2005.

Office Action Summary for Chilean Patent Application No. 2291-2006, May 31, 2010, five pages, Santiago, Chile (Docket No. 20097-Chile).

* cited by examiner

THERMOSETTING ADHESIVES COMPRISING A RESIN HAVING AZETIDINIUM FUNCTIONAL GROUPS

CROSS-REFERENCE TO RELATED APPLICATION

This application claims the benefit of U.S. Provisional Application Ser. No. 60/713,382, filed on Sep. 2, 2005, the entire contents of which are incorporated herein in its entirety by reference.

FIELD OF THE INVENTION

The present invention relates to the use of thermosetting adhesives comprising a resin having azetidinium functional groups for bonding wood, as well as compositions comprising these adhesives, which are used to prepare wood composites such as particleboard and oriented strand board (OSB).

BACKGROUND OF THE INVENTION

Composite wood products have found great favor in various industries. Whether bonded or laminated, composite wood products often exhibit superior properties to wood of similar dimensions. Composite products often are stronger, exhibit better resistance to degradation and failure, and are more cost-effective than wood alone.

Diverse composite wood products have gained acceptance. Particleboard, fiberboard, waferboard, OSB, plywood, laminated veneer lumber (LVL) and laminated beams, made from various wood sources including wood particles, fibers, and/or veneers, are but a few of the composite wood products that have become widely accepted in industry. Such products are formed from wood pieces of appropriate size and form. These wood pieces are bonded together with an adhesive to form the composite wood product.

A number of factors govern the suitability of any particular adhesive for its use in wood composites. For example, because wood is porous and can have varying moisture content, an adhesive should be able to penetrate the wood to a degree sufficient to form the desired bond while accommodating the moisture content of the wood. Also, various varieties of wood have differing grain structures that affect the bonding capability of the wood with adhesive. The adhesive must not only penetrate the wood, but also dry or cure in an appropriate period. Drying too quickly will limit wood penetration and ability to re-position the wood pieces, if necessary. Drying too slowly will cause production delays and thus increase cost.

The ability to form a shape-retaining "green" composite product in which the adhesive has not yet cured, also is important in many applications. In particular, this property requires an adhesive that has sufficient "tack" (i.e., the ability to retain the shape of the product without completely curing). Tack enables adhered particles or layered structures to stick together, rather than move individually, thereby allowing a manufacturer to remove green board from a shape-retaining container before the adhesive is fully cured. This improves composite production rate and eases manufacturing procedures, relative to cases where the adhesive exhibits little or no tack. An adhesive that has tack before complete curing also advantageously allows for re-arrangement of the wood pieces (e.g., wood layers) relative to each other while essentially retaining the form originally imparted. Sufficient tack therefore permits the wood pieces to be packed more efficiently, for example, or to be re-positioned before complete curing of the adhesive.

Finally, a suitable adhesive must accommodate not only the type of wood and wood pieces to be bonded, but also the ultimate use of the composite. For example, composites that are normally exposed to water (e.g., those in outdoor service) have different adhesive requirements than those used in dry locations. Adhesives also should fill any gaps between wood pieces during curing and have a viscosity that allows for rapid application with typical processing equipment.

To accommodate the above considerations and provide desirable properties and characteristics, a number of adhesive systems for wood composites have been developed. For example, aldehyde-based resins formed generally from the reaction product of an aldehyde and an aldehyde-reactive compound (phenol-formaldehyde, urea-formaldehyde, acetone-formaldehyde, melamine-formaldehyde, etc.) have long been recognized to possess favorable tack-building capability, curing rates, and bonding strength. See, for example, U.S. Pat. No. 4,915,766. Recently, there has been increasing interest in reducing emissions during the manufacture of building materials and also from finished building materials, and this has spurred interest in non-formaldehyde based wood adhesives.

Isocyanate-based resins (which, although made from aldehydes, do not emit measurable amounts of aldehydes) are employed in the production of OSB and other composite wood products, as described, for example, in U.S. Pat. No. 5,407,980. Isocyanate resins are known to be particularly resistant to water, and therefore especially useful in the manufacture of exterior products or other products intended for exposure to water. Isocyanate-based resins) however, are not completely satisfactory for the high-speed production of composite wood products, because such adhesives, in their uncured state, have essentially no tack. In applications such as caulless particleboard manufacturing, isocyanate-based resins are wholly unusable due to the absence of sufficient tack required to hold wood particles together as they are conveyed from the forming station to the press. Furthermore, the manufacture of composites using isocyanate-based resins normally requires in-plant emissions controls. Isocyanate-functional resins are also relatively expensive.

In view of the above-noted concerns relating to petroleum-based adhesives, the art has recognized the potential attractiveness of alternatively using protein-based adhesives, in order to reduce the usage of petrochemicals and potentially reduce manufacturing process emissions as well as product emissions. For example, protein glues, such as various casein, blood, and other compositions, have been investigated and are discussed in detail, for example, in the background section of U.S. Pat. No. 6,306,997. Another reason why protein-based adhesives are desirable is that they are made from a renewable resource. Adhesives may be made from protein products (e.g., wheat- and corn-based products), including vegetable powder or flour. Animal proteins have also been used as adhesives.

Adhesives made from soy protein products, particularly hydrolyzed soy protein, are also known. For example, U.S. Pat. Nos. 6,365,650 and 6,231,985 describe an adhesive suitable for preparing wood composites formed by combining an isocyanate prepolymer with hydrolyzed soy protein. Soy protein hydrolyzate, however is unsuitable as an adhesive in certain applications for a number of reasons. It is viscous and dries quickly, often before suitable bonds can be made with the wood. Thus, composite wood products made with soy protein hydrolyzate adhesive often have low strength. Moreover, the use of soy protein in general can render composite products unsuitable for uses involving contact with water or moisture.

The art has attempted to address these and other inherent disadvantages of protein-based adhesive formulations by incorporating various additives. For example, U.S. Pat. No. 5,344,871 describes binders for wood fillers or boards. The binders are principally protein but may be improved with an additive that enhances cross-linking, such as one which forms amide cured epoxys and polyamide.

Similarly, U.S. Publication No. 2004/0089418 describes an adhesive composition for lignocellulosic composites. The adhesive comprises the reaction product of a soy protein or lignin (phenolic polymer) and at least one substantially formaldehyde-free curing agent. The curing agent includes at least one amine, amide, imine, imide, or nitrogen-containing heterocyclic functional group that can react with at least one functional group of the soy protein or lignin.

U.S. Publication No. 2004/0037906 A1 describes reacting a soy protein-based adhesive with a compound that introduces additional phenolic hydroxyl, amine, and/or thiol functional groups into the soy protein structure to provide improved strength and water resistance.

The soy protein additives specifically disclosed in the above-mentioned U.S. Publication No. 2004/0089418 include AMRES® (Georgia-Pacific Corporation) and KYMENE® (Hercules, Inc.), which are well known in the art as useful for imparting wet strength to paper and paper products. The use of such wet strength resins in minor amounts in other applications is described, for example, in U.S. Pat. No. 4,210,692. This patent describes a furnish comprising wood fiber, polymer, mineral fiber, size, and a small amount (0.1-2% by weight) of wet strength agent. The furnish is made into a sheet that is adhered to and forms the outer layer of a wood article.

Even in view of the above disclosures, there is an ongoing need in the art for new adhesives for composite wood products. Especially desired are adhesives that have good tack and thus provide for shortened processing time and contribute to reduced production costs. The adhesives should also exhibit the good bond strength, quick curing properties, and other desirable characteristics traditionally associated with petroleum-based resins. Moreover, such adhesives should emit relatively little or no volatile compounds upon curing or undergoing other processing steps. Finally, the adhesives should also be cost-effective and water-resistant.

SUMMARY OF THE INVENTION

It has now been found that thermosetting adhesives comprising a resin having azetidinium functional groups, such as those used traditionally for improving the wet strength of paper, can be used in compositions for preparing wood composites. Advantageously, these adhesives, although they may comprise predominantly an azetidinium-function resin and/or be substantially or completely free of protein, provide fast tack-building and curing, as well as good bonding properties that are characteristic of aldehyde-based synthetic resins. These thermosetting compositions are applicable in the production of wood composite materials such as particleboard, fiberboard, plywood, and others.

Accordingly, in one embodiment the present invention is a composition for preparing wood composites. The composition comprises (1) a thermosetting adhesive comprising predominantly a resin having azetidinium functional groups and (2) a cellulosic material. The thermosetting adhesive is substantially free of protein. In a preferred embodiment, the cellulosic material comprises a wood element selected from the group consisting of wood particles, wood fibers, wood flakes, wood strands, wood layers, and mixtures thereof. In another preferred embodiment, the thermosetting adhesive comprises protein in an amount of less than 5% by weight, on a dry solids basis. In yet another preferred embodiment, the resin is the reaction product of a polyamidoamine and a halohydrin (e.g., epichlorohydrin).

In another embodiment, the present invention is a wood composite comprising a composition as described above, after the resin is cured. In a preferred embodiment, the wood composite is particleboard or fiberboard.

In another embodiment, the present invention is a method of making a wood composite. The method comprises forming a composition as described above into substantially a shape of a wood composite, board, or panel and consolidating the shaped composition thereby obtained, into the wood composite. In a preferred embodiment, the method comprises forming a mat from the composition and pressing the mat at a temperature from about 135° C. (275° F.) to about 232° C. (450° F.), and more preferably from about 150° C. (300° F.) to about 218° C. (425° F.), for a time from about 3 minutes to about 20 minutes.

In another embodiment, the present invention is a thermosetting adhesive comprising a resin having azetidinium functional groups and further comprising (1) a cross-linking agent selected from the group consisting of a polyamine, a polyamide, urea, a diisocyanate, and a polyol, (2) an aldehyde-based resin or an isocyanate-based resin, or (3) a combination of (1) and (2). In a preferred embodiment, the thermosetting adhesive comprises predominantly the resin having azetidinium functional groups. In another preferred embodiment, the thermosetting adhesive is substantially free of protein. In another preferred embodiment, said (1) cross-linking agent selected from the group consisting of a polyamine, a polyamide, urea, a diisocyanate, and a polyol, (2) aldehyde-based or an isocyanate-based resin, or (3) combination of (1) and (2) comprise one or more additives that are present in an amount such that a dry solids weight ratio of resin having azetidinium functional groups one or more additives is from about 100:1 to about 1:100. In another preferred embodiment, the cross-linking agent is selected from the group consisting of a polyamidoamine, a polyacrylamide, diphenylmethane diisocyanate, and a polyvinylalcohol. In yet another preferred embodiment, the polyacrylamide is a co-polymerization reaction product of acrylamide and a co-monomer (e.g., a diallyldialkylammonium halide such as diallyldimethylammonium chloride).

In another embodiment, the present invention is a method for making a thermosetting adhesive. The method comprises mixing a resin having azetidinium functional groups with (1) a cross-linking agent selected from the group consisting of a polyamine, a polyamide, urea, a diisocyanate, and a polyol, (2) an aldehyde-based resin or an isocyanate-based resin, or (3) a combination of (1) and (2). In a preferred embodiment, the adhesive is substantially free of protein.

In another embodiment, the present invention is an adhesive for bonding cellulosic materials. The adhesive comprises a reaction product of a mixture comprising a resin having azetidinium functional groups and (1) a cross-linking agent selected from the group consisting of a polyamine, a polyamide, urea, a diisocyanate, and a polyol, (2) an aldehyde-based resin or an isocyanate-based resin, or (3) a combination of (1) and (2). In a preferred embodiment, the adhesive is substantially free of protein.

These and other embodiments are apparent from the following Detailed Description.

DETAILED DESCRIPTION OF THE INVENTION

As stated above, thermosetting adhesives of the present invention for use in binding wood composites such as particleboard and plywood, comprise a resin having azetidinium functional groups. In fact, it has now been determined that such thermosetting adhesives may comprise predominantly an azetidinium-functional resin, and still retain desired properties, such as good tack formation and cure rate, as well as ultimately good bond strength. The term "azetidinium" refers to a 4-membered heterocyclic ring structure, bearing a positively charged nitrogen atom. This structure can be broadly characterized as a "quaternary ammonium group" a "quaternary ammonium salt," or other term of art used to signify a moiety bearing a positively-charged nitrogen atom, which can be associated with an anionic species such as chloride, to form a salt.

Resins of the present invention have azetidinium functional groups and, as such, may be characterized as "azetidinium-functional" resins, Without being bound by theory, it is believed that the azetidinium functional groups provide excellent bonding and/or cross-linking with a wide variety of cellulosic materials, such that resins bearing these functional groups are well-suited for use in adhesives for the preparation of wood composites. Representative cellulosic materials used in making wood composites include, but are not limited to, wood particles, wood fibers, wood flakes, wood strands, wood layers, etc. The azetidinium-functional resin, moreover, is thermosetting or "heat reactive," meaning that it cures or forms cross-links, upon the application of heat, thereby providing a strong adhesive bond.

Thermosetting adhesives comprising "predominantly" a resin having azetidinium fictional group are those where the azetidinium-functional resin is present in an amount of at least 50% by weight, on a dry solids basis, of the adhesive. The dry solids weight of the adhesive can be conveniently measured according to art-recognized methods for determining the solids (or non-volatiles) content of resins in general. That is, the dry solids or non-volatiles weight may be measured based on the weight of solids remaining after heating a small (e.g., 1-5 gram), sample of the adhesive at about 105° C. for about 3 hours. Therefore, in thermosetting adhesives comprising predominantly a resin having azetidinium functional groups, the dry azetidinium-functional resin solids account for at least 50% of the total weight of dry solids in the adhesive. In some cases, the resin having azetidinium functional groups may be present in an amount of at least 60% by weight, on a dry solids basis, of the adhesive. Adhesives with the resin having azetidinium functional groups present in an amount of at least 80% by weight, at least 90% by weight, at least 95% by weight, at least 99% by weight, or all of the weight, on a dry solids basis, of the adhesive, are also contemplated.

The requisite azetidinium functional groups can be incorporated onto a variety of polymeric structures (i.e., polymer backbones) including polyethers; polyolefins (e.g., polypropylene); polyacrylamides; polystyrene that may be cross-linked, e.g., with divinylbenzene; polymethacrylate and methacrylate co-polymers; agarose; and cellulose. Such azetidinium functional resins are generally known to exhibit strong anion exchange capacity and are commercially available from a number of suppliers including Georgia-Pacific Corporation and Hercules, Inc.

Preferably, the resin having azetidinium functional groups is an adduct of an epoxide with a polyamine resin, a polyamidoamine resin, or a polyamide resin. Such resins typically are made from glycidylether or epichlorohydrin condensates of polyalkylene polyamines, and they may be water-soluble or water-dispersible. Illustrative commercially-available adducts of epoxides with polyamine resins, polyamidoamines resins, or polyamide resins include those sold under the names AMRES® (Georgia-Pacific Corporation), as well as KYMENE® and REZOSOL® (Hercules, Inc.). Specific examples of such resins include AMRES-25 HP® (Georgia-Pacific Corporation), which is formed from the reaction product of epichlorohydrin and a polyamide, as well as KYMENE 557H® (Hercules, Inc.), which is formed from the reaction product of epichlorohydrin and poly(adipic acid-co-diethylenetriamine). An excess of epichlorohydrin is used to control the rate of cross-linking during the manufacturing process and to aid in storage stability. Such compositions and processes for their manufacture are disclosed, for example, in U.S. Pat. Nos. 2,926,116 and 2,926,154. Cationic polyazetidinium resins are well known in the art as useful for imparting wet strength to paper and paper products.

Polyazetidinium resins, known as polyamidoamine-halohydrin (or generally polyamide-halohydrin) resins, can be formed as reaction products of a polyamine or a polyamidoamine and a halohydrin (e.g., epichlorohydrin or epibromohydrin). Polyamidoamines, in turn, are prepared from the reaction of a polyamine and a polyacid. Suitable polyamines include, but are not limited to, polyalkylene polyamines such as diethylenetriamine or triethylenetetraamine. Other polyamines, such as those in the JEFFAMINE® family (Huntsman, LLC) may also be employed. Mixtures of polyamines are also applicable. Suitable polyacids include diacids such as succinic acid, adipic acid, oxalic acid, phthalic acid, etc. Depending on the mole ratio of the polyamine and polycarboxylic acid, the resulting polyamidoamine may retain predominantly primary amine groups or predominantly carboxylic acid groups at the terminal polymer ends. These termini may also have secondary or tertiary amine moieties. Details pertaining to the possible reactants that may be used to prepare polyamidoamines and the resulting polyamidoamine-halohydrin azetidinium resins, as well as the reaction conditions and synthesis procedures, are described in U.S. Pat. No. 2,926,154, which refers specifically to polyamidoamine-epichlorohydrin resins.

Various modified polyamidoamine-halohydrin resins, which are also characterized as resins having azetidinium functional groups, are known in the art and are suitable for use as the predominant component of the thermosetting adhesive of the present invention. For example, U.S. Pat. No. 5,585,456 describes linking the primary amine ends of polyamidoamine oligomers, synthesized as described above, by reaction with a dialdehyde (e.g., glyoxal). The resulting "chain-extended" polyamidoamine polymer is thereafter contacted with a halohydrin to react with the remaining available amine groups and thereby yield an aqueous polyazetidinium resin having hydrolyzable bonds in its polymer structure. Other modified forms of the cationic, water-soluble polyamidoamine-halohydrin resins useful as azetidinium-functional resins of the present invention include those modified forms described in U.S. Pat. Nos. 3,372,086; 3,607,622; 3,734,977; 3,914,155; 4,233,411, and 4,722,964.

Resins having azetidinium functional groups exhibit superior properties when employed as a component of thermosetting adhesives for wood composites. In contrast to the teachings of U.S. Publication No. 2004/0089418, it has now been found that such thermosetting adhesives provide favorable tack formation, cure rate, and bond strength when the adhesive is substantially free of protein. By "substantially free" is meant that protein, if present in the adhesive, represents less than 10% by weight, usually less than about 5% by weight, and even more often less than about 1% by weight, of the adhesive, on a dry solids basis. Adhesives that are completely free of protein are also contemplated.

In various preferred embodiments, the thermosetting adhesive, in addition to containing a resin having azetidinium functional groups, can also contain, in minor amounts on a dry solids basis, additives such as (1) a cross-linking agent, such as a polyamine, a polyamide, urea, a diisocyanate, a polyol, or mixtures thereof or (2) a heat reactive resin such as an aldehyde-based resin, an isocyanate-based resin, or mixtures thereof Combinations of these additives, such as a combination of (1) and (2) above, can also be employed. Adhesives of the present invention may be prepared using a broad range of weight ratios, on a dry solids basis, of azetidinium-functional resin to additive (or combined additives, when used in combination). Preferably, the additive(s), when used, are present in an amount such that the ratio of azetidinium-functional resin dry solids weight:additive dry solids weight (or combined additive dry solids weight, when additives are used in combination), is from about 10:1 to about 1:10. Typically, this ratio ranges from about 5:1 to about 1:5 and more likely ranges from about 2:1 to about 1:2. For example, a polyacrylamide cross-linking agent may be added to the azetidinium-functional in a dry solids weight ratio of azetidinium-functional resin:polyacrylamide of 2:1. Alternatively, both a polyacrylamide cross-linking agent and a phenol-formaldehyde resin may be added to the azetidinium-functional resin in a dry solids weight ratio of azetidinium-functional resin (polyacrylamide+phenol-formaldehyde) of 2:1.

Preferred polyamine cross-linking agents include the same types of polyamines described above (e.g., polyalkylene polyamines such as diethylenetriamine or hexamethylene tetraamine) that are used to prepare the polyamidoamine precursors of polyazetidinium resins. Likewise, preferred polyamide cross-linking agents include the polyamidoamines described above (e.g., those that are reacted with halohydrin to form polyazetidinium resins), as well as polyacrylamides. Preferred polyacrylamides are prepared as the co-polyerization reaction product of acrylamide with any number of possible co-monomers. These acrylamide co-monomers include 2-hydroxyethylacrylate, acrylonitrile, N-vinylpyffolidone, dimethylacrylamide, vinyl acetate, etc. Diallyldialkylammonium halides (e.g., diallyldimethylammonium chloride or DADMAC) represent a class of other possible acrylamide co-monomers, with which the acrylamide can be co-polymerized. Polyacrylamides having various molecular weights and those prepared with or without various other co-monomers are also contemplated as cross-linking agents.

The diisocyanate and polyol cross-linking agents that can be used in the thermosetting adhesive of the present invention are preferably the isocyanate-functional prepolymers (e.g., diphenylmethane diisocyanate or MDI) and the active hydrogen-functional compounds (e.g., polyether polyols), respectively, that are conventionally reacted to form isocyanate-based resins (i.e., urethanes). Alternatively, these isocyanate-based resins themselves may be incorporated in the adhesive of the present invention. These resins, as well as isocyanate-functional prepolymers, are described in detail, for example, in co-pending U.S. application Ser. No. 11/104,409. Of the diisocyanates, MDI is preferred. Those having skill in the art will appreciate, however, that a wide range of isocyanates in general, including various triisocyanates and higher-functional isocyanates can also serve as cross-linking agents.

Also described in U.S. application Ser. No. 11/104,409 are the active hydrogen-functional compounds reactive with the above-mentioned isocyanate prepolymers. These active hydrogen-functional compounds are likewise effective cross-linking agents in the thermosetting adhesive of the present invention. Polyols are preferred cross-linking agents and polyvinyl alcohol is particularly preferred.

Various aldehyde-based resins, which may be included with the azetidinium-functional resins in the thermosetting adhesive, are also well known in the art and include amine-aldehyde resins such as urea-formaldehyde, melamine-formaldehyde and melamine-urea-formaldehyde resins, aromatic alcohol-aldehyde resins such as phenol-formaldehyde and cresol-formaldehyde, and ketone-aldehyde resins such as acetone-formaldehyde, glyoxalated polyacryamide and others. Aldehyde-based resins are generally recognized by their ability to form adducts, or alkylolation reaction products, upon reaction of the aldehyde with, for example, amides such as urea or aromatic alcohols such as phenol, generally in an alkaline environment. Such resins can then undergo condensation reactions upon the application of heat (and often with a reduction in pH by acidification) to advance the resin molecular weight by forming alkylene ether or alkylene bridges between the alkylolated species. These aldehyde-based resins are therefore similar to the azetidinium-functional base resin of the thermosetting adhesive, in that they are thermosetting or "heat reactive." Such heat reactive resins have reactive functional groups (e.g. alkylol groups) that cause the resin to further polymerize or cross-link when heat is applied, thereby forming a rigid, cross-linked polymer end product. Aldehyde-based resins (and particularly phenol-aldehyde resins), their preparation (including starting materials, reaction conditions, and possible additives), their properties, and other information pertaining to these resins, are described in detail, for example, in co-pending U.S. application Ser. No. 11/137,793.

The additives described above, when used alone or in combination, may in some cases be employed in minor amounts (i.e., representing, alone or in combination, less than 50% by weight of the adhesive, on a dry solids basis) to help ensure that they are not detrimental to the overall beneficial properties of the azetidinium-functional resin (e.g., which can potentially result if the adhesives inherit substantially the characteristics of the additives). For example, in the embodiments wherein an aldehyde-based resin is added, the adhesive is still preferably well in compliance with formaldehyde emissions standards such as those described in the European standard EN 13986 or the Japanese Industrial Standard JIS A 5908. Likewise, in embodiments wherein a polyurethane resin or a diisocyanate cross-linking agent is added, the adhesive still has sufficient tack to hold wood particles or layers together as they are conveyed from a forming station to a press.

In cases where the adhesive comprises only the azetidinium-functional resin, the emission of formaldehyde from wood composite products corresponds essentially to a background level, such as that associated with the emission from the wood element alone. Also, adhesives comprising the azetidinium-functional resin by itself exhibit sufficient tack for preparing wood composites under a wide range of manufacturing conditions and using a wide range of production methods.

When resin additives or other agents described above, such as cross-linking agents or aldehyde-based heat reactive resins, are used in the thermosetting adhesive, they may added in any conventional manner. That is, they may be blended or mixed therein as an aqueous solution or dispersion. Otherwise, they may be added in a solid form (e.g., a "neat" form of the resin that has been spray dried or freeze dried) to provide the adhesive of the present invention. Alternatively, the resin having azetidinium functional groups may be added as solid, to a solution or dispersion of any of the additives described above. The form of the components is not critical.

The thermosetting adhesive of the present invention comprises a resin having azetidinium functional groups as described above. The resin (and therefore the adhesive) is generally in the form of an aqueous solution or dispersion. Preferably, the resin is in the form of an aqueous solution or dispersion having a solids content from about 5% to about 80% by weight, typically from about 5% to about 75% by weight, and more usually from about 20% to about 65% by weight. The balance of such a solution or dispersion may be water, optionally containing various additives known in the art to improve tack, viscosity, bonding strength, cure rate, moisture resistance, and other adhesive characteristics. Thus, the thermosetting adhesive may include, for example, additional curing accelerators (e.g., alkali metal and alkaline earth metal carbonates and hydroxides, such as sodium hydroxide), thickeners, fillers, extenders (including flours such as wheat flour or corn flour), adduct-forming agents, and/or additional tack promoters (e.g., borax). These additives are described, for example, in U.S. Pat. No. 4,915,766. The use of such additives is particularly relevant to the production of wood veneer composites, where it is necessary to achieve satisfactory retention of the adhesive on the veneer surface and sufficient tack for pre-press consolidation (described below) and cure speed. Other curing accelerators include, e.g., acetates, including triacetin; carbamates; esters; lactones; carbonates; sulfates, including ammonium sulfate, sodium sulfate, and aluminum sulfate. Other cross-linking agents, including lower cost, multi-functional materials such as urea, may also be used.

The thermosetting adhesive of the present invention may also be prepared in a solid form such as a powder that can be reconstituted into an aqueous solution or dispersion. In one embodiment, the powder form of the adhesive is prepared by drying (e.g., freeze-drying) or lyophilizing the adhesive and thereafter grinding it under conditions effective to form a powder. In another embodiment, a powder form of the thermosetting adhesive can be manufactured with a spray drier, resulting in a powder having desirable qualities, especially with respect to uniformity in particle size. The powder form of the adhesive may be preferred in some instances, because of an extended storage life when properly stored.

The thermosetting adhesives described above are incorporated into wood-composite-forming compositions comprising cellulosic materials (e.g., particulate or layered cellulosic materials). Accordingly, the cellulosic material comprises a wood element, such as wood particles, wood fibers, wood flakes, wood strands, or wood layers (e.g., wood veneers). The cellulosic material may also comprise a mixture of a plant fiber and a wood element. Useful plant fibers include wheat straw fibers, rice fibers, switchgrass fibers, soybean stalk fibers, bagasse fibers, cornstalk fibers, and mixtures thereof. Preferably, in wood composite products of the present invention, the cellulosic material is present in an amount from about 85% to about 98% by weight, on a dry solids basis.

Wood flakes may be produced by procedures known to those skilled in the art and described, for example, by Koch, "Utilization of Hardwoods Growing on Southern Pine Sites," Vol. 11, USDA Forest Service, Agriculture Handbook No. 605 (1985), Fiber furnishes containing wood fiber, plant fiber, or a combination thereof may be produced by procedures known to those skilled in the art and described, for example, by Suchsland et al., "Fiberboard Manufacturing Practices in the United States," USDA Forest Service, Agriculture Handbook No. 640 (1986). Cornstalk fibers and other plant fibers may also be produced with an atmospheric disk refiner as described by Kuo et al, "Properties of Wood/Agricultural Fiberboard Bonded with Soybean-based Adhesives," For. Prod. J., 48:71-75 (1998).

The thermosetting adhesives may further comprise a wax emulsion. Wax emulsions or slack wax are used in producing wood composite panels having improved moisture resistance or, more specifically, reduced water absorption and water vapor adsorption. For example, a suitable wax emulsion is Cascowax EW-403H, commercially available from Borden Chemical, Inc.

Methods of the present invention for making a wood composite involve applying the thermosetting adhesive to the cellulosic material comprising a wood element, as described above to yield a thermosetting cellulosic composition. The thermosetting adhesive may be applied to the cellulosic material in any conventional manner. For example, if a particulate cellulosic material (e.g., wood particles wood fibers, wood flakes, or wood strands) is used, this material may be coated by, sprayed by, mechanically mixed into, etc., the thermosetting adhesive. Likewise, if wood veneers or layers are used as the cellulosic material, they may be brushed sprayed, coated, etc., at mating surfaces, with the thermosetting adhesive, prior to consolidation to make a wood composite. Any of the additives of the thermosetting adhesive described above, for example a cross-linking agent such as a polyacrylamide, may be combined with a base adhesive prior to application to the cellulosic material. Alternatively, additives may be introduced into the cellulosic composition after a base adhesive is applied to the cellulosic material.

One method of applying the thermosetting adhesive is by continuous mixing of separate streams of a base adhesive (e.g., comprising only the azetidinium-functional resin) and an additive (e.g., comprising only a cross-linking agent) as described above. The flow rates of the streams may be continuously monitored and adjusted to provide a ratio in the thermosetting adhesive that varies in response to one or more measured variables (e.g., wood moisture content). Such a method is described, for example, in U.S. Pat. No. 6,607,619. Another particular method involves applying the thermosetting adhesive in a liquid form to the cellulosic material (e.g., particulate or layered material) by a nozzle atomizer or by a spinning-disk atomizer. The thermosetting adhesive may also be applied in a powder form as described above. In another embodiment, the thermosetting adhesive is applied onto the cellulosic material by first spraying it with the liquid thermosetting adhesive and thereafter combining the resulting sprayed cellulosic material with a powder form of the thermosetting adhesive. Thus, liquid and powder forms of the thermosetting adhesive may be used in combination to reduce the amount of moisture added to the cellulosic material.

A composition for preparing wood composites therefore comprises the thermosetting adhesive of the present invention and the cellulosic material, to which the adhesive is applied in any manner described above. In making the wood composite, the composition is first formed into substantially the shape of the composite. The shaped composition is then consolidated to provide the composite. The cellulosic composition is typically consolidated, for example, by applying heat and pressure to form a wood composite having desired dimensions (e.g., thickness). By consolidating the composition of the present invention, wood composite products exhibiting excellent strength characteristics and low volatile emissions can be produced. For example, wood composite products of the present invention have internal bond (IB) strengths sufficient to satisfy industry standards and typically exhibit IB values of greater than about 100 pounds per square inch (psi), as measured according to ASTM D 1037. Typically, the bond strength is in the range from about 100 psi to about 300 psi, and more usually from about 120 psi to about 250 psi.

As is recognized in the art, for any given adhesive, the resulting bond strength often can be increased or decreased by increasing or decreasing the amount of adhesive applied, relative to the amount of cellulosic material. The bond strength ranges given above can be obtained by forming and consolidating compositions for preparing wood composites, wherein the cellulosic material is present in an amount from 92-96% by weight, on a dry solids basis. Bond strengths within the ranges given above may be obtained for adhesives comprising only the azetidinium-functional resin (e.g. without any added cross-linking agent or other resin). However, it is also recognized that the use of cross-linking agents can directionally increase bond strength. The impact of any particular cross-linking agent on bond strength depends on a number of factors, including the chemical functionality of the cross-linking agent, its molecular weight, its solids content, etc. Such factors can be taken into consideration in optimizing the level of cross-linking agent in the adhesive.

In producing particleboard or fiberboard (e.g., medium density fiberboard), which are preferred wood composite products, the thermosetting cellulosic composition, containing the adhesive and a particulate cellulosic material, may be formed into substantially the shape of a mat (e.g., by spreading the composition onto a flat surface). The mat may then be consolidated or cured under heat and pressure to form the particleboard or fiberboard wood composite. Procedures for forming mats are known in the art and are described, for example, by Maloney, MODERN PARTICLEBOARD AND DRY-PROCESS FIBERBOARD MANUFACTURING Miller Freeman Publications, San Francisco, Calif. (1997). The formed mat is pressed to a pre-determined thickness at a sufficient pressure and at a temperature preferably ranging from about 150° C. (300° F.) to about 218° C. (425° F.) for a time from about 3 minutes to about 20 minutes, in order to cure the thermosetting cellulosic composition and obtain the wood composite. Preferably, the mat is pressed at about 165° C. (330° F.). The pressure used may be within the range from about 100 psi to about 600 psi, and varies according to the press temperature, type of adhesive, the of wood composite, and other factors recognized by those skilled in the art. In a typical consolidation operation to prepare particleboard, a high pressure (e.g., 600 psi) is applied initially, followed by a steady "bleeding" of the pressure as the thermosetting adhesive cures at the consolidation temperatures described above. Thus, in a normal commercial particleboard manufacturing operation, continuous or multi-opening presses are heated to 165° C. (330° F.) to 180° C. (360° F.) and used to apply pressures of up to about 600 psi. Press or cycle times will typically be within the range given above, but can vary depending on the type of press, press temperature, and board thickness. Advantageously, using the adhesives of the present invention, these conditions are not expected to differ significantly, relative to conventional practices using, for example, urea-formaldehyde based adhesives.

In general, the press time and/or temperature used for consolidation of the shaped composition may be decreased by the use of cross-linking agents, catalysts, or cure accelerants, as known in the art and/or described above. The preferable press time and temperature, however, also depend on the moisture content of the mat. Mats formed from particulate cellulosic material that is sprayed with the thermosetting adhesive in liquid form typically have a relatively higher moisture content and require a longer press time. In comparison, when the thermosetting adhesive is applied to particulate cellulosic material as a combination of liquid and powder for as described above, a shorter press time usually is sufficient to consolidate the mat. When used in powder form, the thermosetting adhesive may be mixed with particulate cellulosic material, filled in a mold, and consolidated under elevated temperature and pressure to produce a shaped wood composite (i.e., a compression molded product).

Wood layers or veneers can be used as the cellulosic material described above to produce wood composite panels. For example, plywood can be made from a plurality of wood layers or veneers by applying the thermosetting adhesive of the present invention to mating surfaces of these wood layers or veneers and thereafter consolidating them. In the case of plywood, consolidation typically comprises (i) pre-pressing the surface or surfaces of wood veneers, to which the adhesive has been contacted, under pre-pressing conditions to form a panel, followed by (ii) hot-pressing the panel at curing conditions to cure the adhesive. Pre-pressing conditions typically include ambient temperature, a pressure from about 100 psi to about 200 psi, and a time of less than about 10 minutes. The degree of pre-pressing is normally just sufficient to produce panels that resist delamination under normal conditions of storage and handling. After pre-pressing, hot-pressing is conducted to carry out or complete the cure of the thermosetting adhesive. Hot-pressing conditions preferably include a temperature from about 135° C. (275° F.) to about 232° C. (450° F.), a pressure from about 100 psi to about 200 psi, and a time from about 1 minute to about 80 minutes.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set fort as representative of the present invention. These examples are not to be construed as limiting the scope of the invention as these and other equivalent embodiments will be apparent in view of the present disclosure and appended claims.

EXAMPLE 1

Particleboard was made using wood particle furnish obtained from a Georgia-Pacific particleboard mill, to which the commercially-available resin AMRES-25 HP® (Georgia-Pacific Corporation), was applied. AMRES-25 HP® is a resin having azetidinium functional groups that is formed from the reaction product of epichlorohydrin and a polyamide. This resin is sold as a solution in water with a solids content of 25% by weight.

On a dry weight basis, 100 parts of the wood furnish were mixed with 4 parts of AMRES-25 HP® solids in a ribbon blender. The composition was then introduced into a 16"×16" deckle box in a quantity sufficient to make 0.5" thick particleboard with a density of 720 kg/m³ (45 lb/ft³). The composition was spread uniformly into substantially the shape of the board and pressed in a 2'×2' press to make a particleboard sample at a temperature of 165° C. (330° F.) for 420 seconds against 0.5" metal stops.

The pressed mat, representing a wood composite of the present invention, was then tested according to ASTM D 1037 and found to have an internal bond strength of 137 psi. For reference, the American National Standard for particleboard (ANSI A208.1) requires internal board strengths of 80 psi for M-3 industrial grade boards of similar densities.

EXAMPLE 2

On a dry weight basis, 100 parts of the wood furnish described in Example 1 were mixed with 4 parts of AMRES-25 HP® solids and 2 parts of a polyamide cross-linking agent solids (i.e., providing a 2:1 weight ratio, on a dry solids basis, of AMRES-25® HP:polyamide, or 67% by weight AMRES-25 HP®, in the adhesive). The polyamide used was the precursor used in preparing AMRES-25 HP®, prior to its reaction with epichlorohydrin to make the azetidinium-functional resin. In particular, this polyamide was made from diethylene triamine (DETA) and adipic acid. The polyamide was used as a solution in water having a solids content of 40% by weight.

In this example, the AMRES-25 HP® and the polyamide were mixed, as liquid components, in a spray can prior to applying the resulting thermosetting adhesive mixture to the wood furnish. However, these two components could also have been applied separately to the famish with the expectation of comparable results. The resulting resinated furnish composition was added to a deckle box, formed, and consolidated as described in Example 1.

The pressed mat, representing a wood composite of the present invention, was then tested according to ASTM D 1037 and found to have an internal bond strength of 247 psi when pressed for 600 seconds or 202 psi when pressed for 420 seconds.

EXAMPLE 3

On a dry weight basis, 100 parts of the wood Wish described in Example 1 were mixed with 4 parts of AMRES-25 HP® solids and 2 parts of a polyacrylamide cross-linking agent solids (i.e., providing a 2:1 weight ratio, on a dry solids basis, of AMRES-25 HP polyacrylamide, or 67% by weight AMRES-25® HP in the adhesive), where the polyacrylamide was prepared as the co-polymerization reaction product of acrylamide and diallyldimethylammonium chloride (DAD-MAC). The polycrylamide was used as a solution in water having a solids content of 25% by weight.

As in Example 2, the AMRES-25 HP® and the polyacrylamide were mixed, as liquid components, in a spray can prior to applying the resulting thermosetting adhesive mixture to the wood furnish. However, these two components could also have been applied separately to the furnish with the expectation of comparable results. The resulting resinated furnish composition was added to a deckle box, formed, and consolidated as described in Example 2.

The pressed mat, representing a wood composite of the present invention, was then tested according to ASTM D 1037 and found to have an internal bond strength of 197 psi when pressed for 500 seconds.

What is claimed is:

1. A composition for preparing wood composites, said composition comprising (1) a thermosetting adhesive comprising predominantly a resin having azetidinium functional groups; (2) a wood element selected from the group consisting of wood flakes, wood strands, wood particles, wood layers, and mixtures thereof; and (3) urea as a cross-linking additive.

2. The composition of claim 1 herein said wood element is present in an amount from about 85% to about 98% by weight, on a dry solids basis, of said composition.

3. A wood composite comprising the composition of claim 1, after said resin is cured.

4. The wood composite of claim 3, wherein said wood composite is particleboard or fiberboard.

5. The wood composite of claim 1, wherein the wood element is wood strands.

6. The wood composite of claim 1, wherein the wood element is selected from the group consisting of wood flakes, wood strands, wood particles, and wood layers.

7. A method of making a wood composite, the method comprising:
    (a) forming the composition of claim 1 into substantially the shape of said wood composite, and
    (b) consolidating a shaped composition obtained in step (a) using heat and pressure into said wood composite.

8. The method of claim 7, wherein the wood composite has an internal bond strength as measured by ASTM D 1037 between 100 psi and 300 psi.

9. The method of claim 8, wherein the wood composite has an internal bond strength as measured by ASTM D 1037 between 120 psi and 250 psi.

10. A composition for preparing wood composites, said composition comprising (1) a thermosetting adhesive comprising predominantly a resin having azetidinium functional groups; (2) a wood element selected from the group consisting of wood flakes, wood strands, wood particles, wood layers, and mixtures thereof; and (3) urea as a cross-linking additive, wherein the thermosetting adhesive is substantially free of protein.

11. The composition of claim 10, wherein said wood element is present in an amount from about 85% to about 98% by weight, on a dry solids basis, of said composition.

12. A wood composite comprising the composition of claim 10, after said resin is cured.

13. The wood composite of claim 12, wherein said wood composite is particleboard or fiberboard.

14. The wood composite of claim 12, wherein the wood element is wood strands.

15. The wood composite of claim 10, wherein the wood element is selected from the group consisting of wood flakes, wood strands, wood particles, and wood layers.

16. A method of making a wood composite, the method comprising:
    (a) forming the composition of claim 10 into substantially the shape of said wood composite, and
    (b) consolidating a shaped composition obtained in step (a) using heat and pressure into said wood composite.

17. The method of claim 16, wherein the wood composite has an internal bond strength as measured by ASTM D 1037 between 100 psi and 300 psi.

18. The method of claim 17, wherein the wood composite has an internal bond strength as measured by ASTM D 1037 between 120 psi and 250 psi.

\* \* \* \* \*